United States Patent
Pettit et al.

(10) Patent No.: US 7,357,606 B1
(45) Date of Patent: Apr. 15, 2008

(54) SELF-ADVANCING STEP-TAP TOOL

(75) Inventors: Donald R. Pettit, Houston, TX (US); Ronald K. Penner, Hampton, VA (US); Larry D. Franklin, Hampton, VA (US); Charles J. Camarda, League City, TX (US)

(73) Assignee: United States of America as represented by the Administrator of the National Aeronautics and Space Administration, Washington, DC (US)

( * ) Notice: Subject to any disclaimer, the term of this patent is extended or adjusted under 35 U.S.C. 154(b) by 192 days.

(21) Appl. No.: 11/357,461

(22) Filed: Feb. 3, 2006

(51) Int. Cl.
*B23G 5/20* (2006.01)
*B23B 51/08* (2006.01)

(52) U.S. Cl. ............ 408/222; 408/1 R; 408/225; 470/199

(58) Field of Classification Search ........ 408/215–216, 408/222–225, 1 R; 470/198–199; *B23G 5/06, B23G 5/20; B23B 51/08*
See application file for complete search history.

(56) References Cited

U.S. PATENT DOCUMENTS

| | | | |
|---|---|---|---|
| 1,475,561 A * | 11/1923 | Bath et al. ............... 408/222 |
| 3,877,099 A | 4/1975 | Halpern |
| 4,761,844 A | 8/1988 | Turchan |
| 4,831,674 A | 5/1989 | Bergstrom et al. |
| 4,930,949 A | 6/1990 | Giessler |
| 4,943,191 A | 7/1990 | Schmitt |
| 5,080,538 A | 1/1992 | Schmitt |
| 5,098,232 A | 3/1992 | Benson |
| 5,152,642 A | 10/1992 | Pitts et al. |
| 5,413,438 A | 5/1995 | Turchan |
| 5,429,459 A | 7/1995 | Palm |
| RE35,255 E | 5/1996 | Turchan |
| 5,515,750 A | 5/1996 | Green |
| 5,678,962 A | 10/1997 | Hyatt et al. |
| 5,733,078 A | 3/1998 | Matsushita et al. |
| 5,944,462 A | 8/1999 | Woodward |
| 6,012,882 A | 1/2000 | Turchan |

(Continued)

FOREIGN PATENT DOCUMENTS

DE 3246663 A1 * 6/1984

(Continued)

*Primary Examiner*—Daniel W. Howell
(74) *Attorney, Agent, or Firm*—Theodore U. Ro (57) ABSTRACT

Methods and tool for simultaneously forming a bore in a work piece and forming a series of threads in said bore. In an embodiment, the tool has a predetermined axial length, a proximal end, and a distal end, said tool comprising: a shank located at said proximal end; a pilot drill portion located at said distal end; and a mill portion intermediately disposed between said shank and said pilot drill portion. The mill portion is comprised of at least two drill-tap sections of predetermined axial lengths and at least one transition section of predetermined axial length, wherein each of said at least one transition section is sandwiched between a distinct set of two of said at least two drill-tap sections. The at least two drill-tap sections are formed of one or more drill-tap cutting teeth spirally increasing along said at least two drill-tap sections, wherein said tool is self-advanced in said work piece along said formed threads, and wherein said tool simultaneously forms said bore and said series of threads along a substantially similar longitudinal axis.

18 Claims, 4 Drawing Sheets

U.S. PATENT DOCUMENTS

| | | |
|---|---|---|
| 6,257,810 B1 | 7/2001 | Schmitt |
| 6,345,941 B1 | 2/2002 | Fang et al. |
| 6,554,550 B2 * | 4/2003 | Chapel et al. .............. 408/1 R |
| 2005/0058521 A1 | 3/2005 | Stevenson et al. |

FOREIGN PATENT DOCUMENTS

| | | | |
|---|---|---|---|
| DE | 10305198 A1 | * | 8/2004 |
| JP | 05138439 A | * | 6/1993 |
| JP | 05253747 A | * | 10/1993 |
| JP | 10315027 A | * | 12/1998 |
| JP | 2006198685 A | * | 8/2006 |

\* cited by examiner

SELF-ADVANCING STEP-TAP TOOL

GOVERNMENT INTERESTS

Origin of the Apparatus

The apparatuses and methods described herein were made by employee(s) of or under contract with the United States Government and may be manufactured and used by or for the Government of the United States of America for governmental purposes without the payment of any royalties thereon or therefor.

BACKGROUND

This invention is in the field of cutting tools and processes for making a hole, threaded hole, or both in or on a work piece. More particularly, this invention relates to combined hole making and threading tools for a hand-held drill that require about no external axial force for advancement through a work piece after an initial pilot hole is created.

Related art has employed various tool structures for cutting holes, threads, or both in a work piece. Generally, tool structures are influenced by application and performance specifications. In the wake of the Space Shuttle Columbia tragedy, it was recognized that a need existed to perform field repairs of a spacecraft's Thermal Protection System (TPS), wherein the TPS is comprised of heat shield materials necessary for atmospheric re-entry. Field repairs in this unique application are comprised of repairing sections of broken leading edge materials and broken tile materials in the exoatmospheric space environment of Low Earth Orbit. The repairs must be made while the operator or astronaut is in a spacesuit. In this scenario of unique environment and unique wear, there are limitations to the applied axial and torsional forces allowed while in a spacesuit, due to the combination of a micro-gravity environment, the reaction forces between the space vehicle (e.g., Space Shuttle), and the platform supporting the suited astronaut. The apparatus and its multiple embodiments described herein serve to solve the unique problems that exist in the scenario described above.

Although the genesis of the apparatus, its multiple embodiments, and its methods of use originate in the scenario described above, there are many terrestrial applications where it is desirable to minimize the required axial force used to cut a hole, thread, or both in a work piece. However, available drill bit art requires significant axial forces to produce a hole. Further, required axial force loading for the related drill bit art is markedly increased as the hole-size becomes larger. It is not uncommon to require an axial force in excess of about 75 pounds to make holes from one-half to one inch in diameter. For large holes, drilling machines are the preferred apparatus since the required forces from a hand-held drill can become unobtainable, fatiguing, or both relative to an operator. In cases involving the operation of a hand-held drill, an operator generally exerts his/her body weight behind the drill to facilitate the cutting of a hole. Drilling "overhead" holes can be particularly exhausting for an operator. Repetitive drilling is fatiguing and limits operator productivity. Safety is also another important factor for hand-held drilling, especially for thinner work pieces. As the external axial force is increased, the likelihood of a drill bit grabbing the work piece and spinning the work piece, pulling the drill out of the operator's hand, or both becomes a threat to the operator's personal safety.

In related art, threaded holes and bores are most frequently produced with multiple tools, typically including a center or spot drill for centering the subsequent tools and creating an initial chamfer, a drill for creating the core hole or bore, a counterbore tool, and a tap for threading the hole. Further, there exist drill bits that make a single-sized hole, step drill bits that allow holes to be enlarged in a series of steps, taps that thread one size of a pre-existing hole, and drill-taps that first drill a hole with a drill bit fashioned after one for a single-sized hole and then tap after the hole is drilled.

In other related art, special drills are known which consolidate the center or spot drill, the drill for creating the core hole or bore, and the counterbore tool. This consolidation is accomplished by incorporating multiple diameters into the grind of the tool. However, the shape of such a tool is complex, and it is general expensive to manufacture and regrind. Since the diameters of the counterbore and chamfer are ground into the tool, they cannot be varied in use. Likewise, the length of the hole created in the work piece, as well as the relative lengths of portions of the bore, is dependent on the length of the corresponding portions of the tool which are predetermined.

U.S. Pat. No. 5,678,962 to Hyatt et al. discloses a unitary bore forming and threading tool for producing a variety of threaded boars having chamfers and counterbores without a need for tool change. The disclosed invention enables the creation of a variety of bores such as chamfers, counterbores, and threaded bores by producing bore portions of selectively determined distinct diameters by sequentially axially feeding the tool into a work piece along distinct tool paths without changing tools. This invention relies on moving the tool in a selective multi-axis path to form threads using a high-speed drilling machine or thread mill. Thus, this invention does not concurrently form a hole and cut a series of threads. Rather, this tool relies on separate and distinct hole-forming and thread-forming phases.

U.S. Pat. No. 6,012,882 to Turchan discloses a combined hole making, threading, and chamfering tool with staggered thread cutting teeth designed for a high-speed thread mill. Depending on the application, this invention can be fed into a work piece either linearly (along a predetermined longitudinal axis) or by multi-axis interpolation, including helical interpolation. However, threads are formed by helical motion and not along a predetermined longitudinal axis. Thus, this invention also relies on separate phases for hole creation and thread forming.

Thus, a need exists for an improved tool structure that cuts a hole, a thread, or both in a work piece with about no external axial force requirement for the tool's advancement through the work piece.

DETAILED DESCRIPTION

The present apparatus and method will now be described more fully hereinafter with reference to the accompanying drawings, in which embodiments of the apparatus and method are shown. This innovation may, however, be embodied in many different forms and should not be construed as limited to the embodiments set forth herein; rather, these embodiments are provided so that this disclosure will be thorough and complete and will fully convey the scope of the method to those skilled in the art. Like numbers refer to like elements throughout.

The term "about" as used herein may be applied to modify any quantitative representation that could permissibly vary without resulting in a change in the basic function to which it is related. For example, a quantitative load as disclosed herein may permissibly be different than the precise value if the basic function to which the load is related does not change. "Self-advance" or any form thereof as used herein is defined as advancement of any embodiment of the subject apparatus through or within a work piece with an about no external axial force requirement. "Hole" and "bore" are herein used interchangeably. "Pitch" is the inverse of "threads per inch" or generally, "threads per unit distance."

Figure 1A:
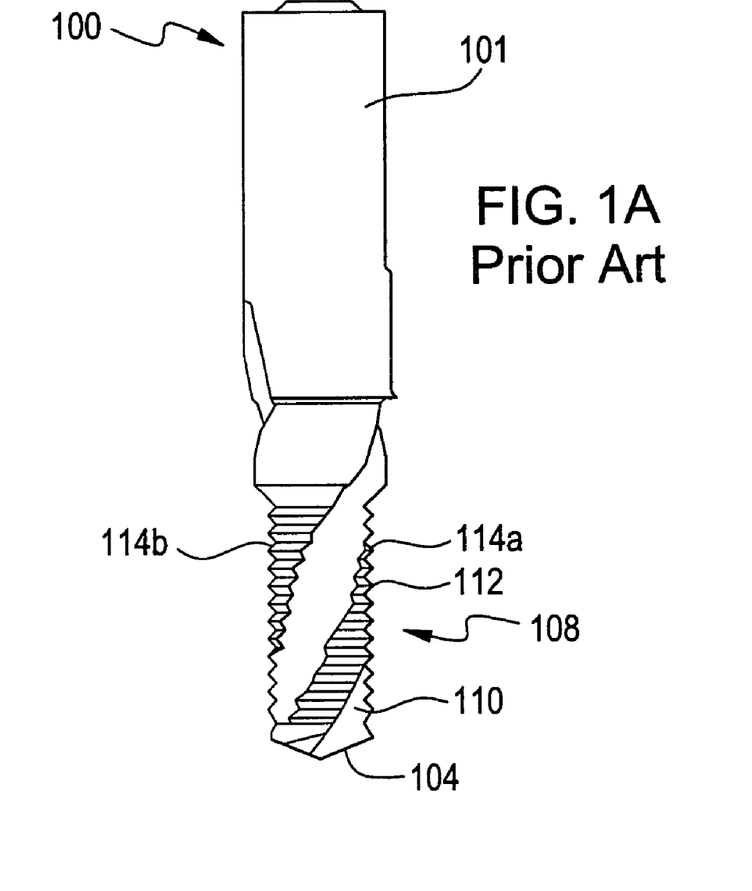
FIG. 1A illustrates a side view of a related art tool combined hole making and threading tool.
Figure 1B:
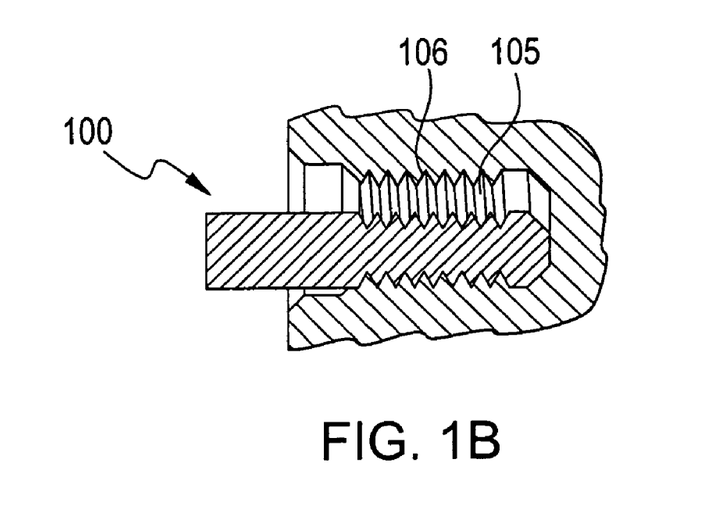
FIG. 1B illustrates the related art tool (in FIG. 1A) forming threads in a hole.

Referring now to the drawings, and in particular to FIG. 1A, a related art combined hole making and threading tool, generally illustrated as 100, is shown. The related art tool 100 includes a shank 101 on one end, a drill point 104 at the forward end, and a thread-form mill 108 intermediate the drill point 104 and the shank 101. A plurality of thread-form cutters 112 and one or more flutes 110 are formed on the thread-form mill 108 for the purpose of chip removal. Each thread-form cutter 112 comprises a number of cutter segments 114a and 114b circumferentially aligned in axial rows and separated by the individual flute 110. Each of the thread-form cutters 112 is of annual configuration. Tool 100 is designed to drill a hole 105 and then cut threads in two distinct and separate phases. As is known, the hole 105 formed in the work piece includes a wall 106. During the thread cutting phase, the thread cutting segments 114a and 114b are laterally displaced into the wall 106 of the hole 105 as is illustrated in FIG. 1B. This lateral displacement occurs by helically infeeding tool 100 in the hole 105. As the tool 100 rotates, threads are cut into the wall of the hole in the work piece, generating cutting forces that act on the tool 100, including the thread-form mill 108.

Figure 2A:
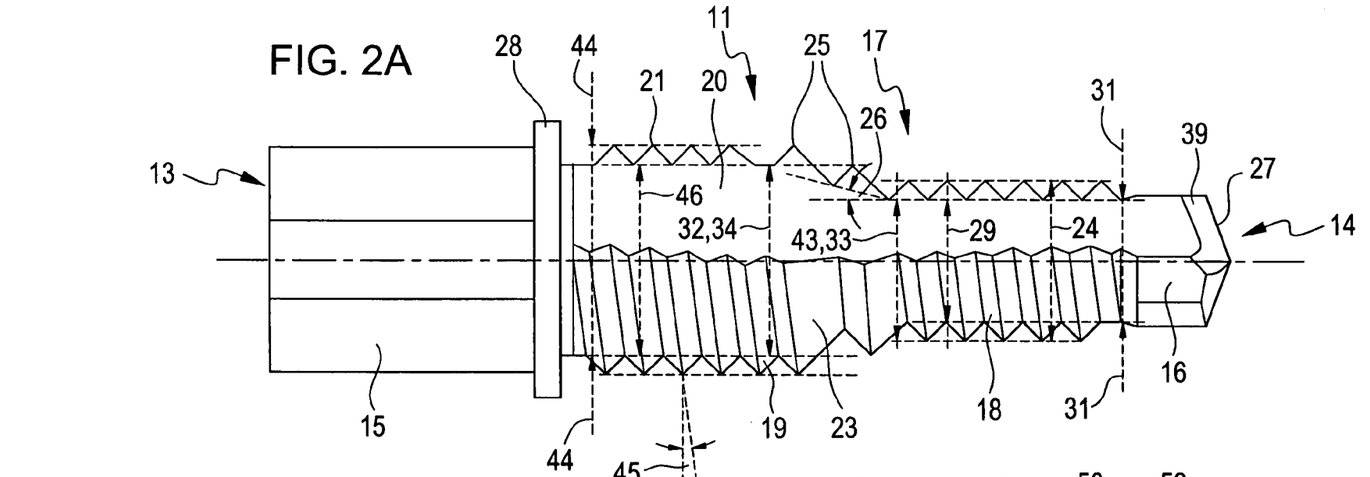
FIG. 2A illustrates a side view of a combined hole making and threading tool according to an embodiment of the present apparatus.
Figure 2B:
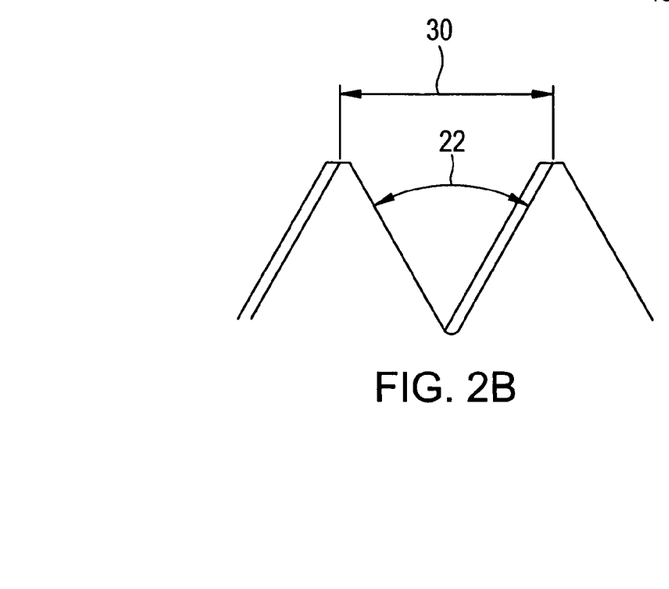
FIG. 2B illustrates a partial side view of two cutting teeth of constant major and minor diameters according to an embodiment of the present apparatus.

With particular reference to FIGS. 2A and 2B, there is shown an embodiment of a self-advancing step-tap combined hole making and threading tool 11 and an enlarged view of two cutting teeth. The tool 11 has a predetermined axial length as well as proximal 13 and distal 14 ends. A shank 15 of predetermined axial length is located at the proximal end 13. The shank 15 represents a means for inserting the tool 11 in the clamping jaws or chuck of a hand-held drill or other boring device. A pilot drill portion 16 is located at the distal end 14. The pilot drill portion 16 is a means for boring an initial hole in a work piece. Intermediate to the shank 15 and pilot drill portion 16 is a mill portion 17 which is comprised of at least two drill-tap sections 18,19 wherein each of said at least two drill-tap sections 18,19 has a unique minor diameter 29,46, respectively or unique range of minor diameters in relation to each drill-tap section (not shown). Stated differently, each of said at least two drill-tap sections 18,19 has a predetermined first distal diameter 31,32 and a predetermined first proximal diameter 43,44, respectively. In FIG. 2A, the first distal diameter and first proximal diameter for each of the two drill-tap sections 18,19 are equivalent. However, in an embodiment, the first distal diameter and first proximal diameter for each of the at least two drill-tap sections are not equivalent. The mill portion 17 is also comprised of at least one transition section 23, wherein each of said at least one transition section 23 is sandwiched between a distinct set of two of said at least two drill-tap sections. In FIG. 2A, two drill-tap sections are illustrated, therefore one transition section 23 is sandwiched between the illustrated two drill-tap sections 18,19. Each of the at least one transition section 23 has a predetermined second distal diameter 33 and a predetermined second proximal diameter 34. The second distal diameter 33 is less than the second proximal diameter 34 for each of the at least one transition section 23. As illustrated in FIG. 2, the second distal diameter 33 is equivalent to the first proximal diameter 43 of the first drill-tap section 18. Similarly, the second proximal diameter 34 is equivalent to the first distal diameter 32 of the second drill-tap section 19. Further, a plurality of drill-tap cutting teeth 21 are formed on each of the at least two drill-tap sections 18,19, wherein each drill-tap cutting tooth is comprised of a predetermined "angle of thread" or "cutting angle" 22 and a predetermined major diameter 24. Still further, the plurality of cutting teeth 21 are formed of a predetermined pitch 30. In an embodiment, at least one flute 20 is also formed on said mill portion 17. In addition, in an embodiment, the tool 11 is designed to create a threaded hole in a work piece wherein the depth of the work piece is less than the overall axial length of the tool 11. In a specific embodiment, the axial length of the last drill-tap section is greater than the depth of a desired work piece. In other words, in an embodiment, tool 11 is designed to cut through a work piece as opposed to boring a hole of a predetermined depth in a work piece. Further, in another embodiment, tool 11 is also comprised of a stop-lip 28 located immediately axially rearward of the last at least two drill-tap sections. The stop-lip 28 is a structural rim radially surrounding the tool 11 and represents a means for preventing the tool 11 from passing through the created hole 41.

The tool and its multiple embodiments described herein represents more than a simple combination of available related art. A simple combination of a step-drill and a tap does not yield a functional drill bit. As will be discussed below, a particular application must be evaluated and a detailed engineering review performed to determine the proper combination of step size, cutting angle, thread-advance, etc. to produce a viable self-advancing step-tap combined hole making and threading tool.

With continued reference to FIG. 2A, the pilot drill portion 16 will be discussed in more detail. In operation, the pilot drill portion 16 is a means for making an initial pilot hole before engagement by the first of the at least two drill-tap sections 18,19. The pilot drill portion 16 is located axially forward of the mill portion 17. The distal end 14 of the tool 11 is part of the pilot drill portion 16. The pilot drill portion 16 is comprised of an end cutting surface 27. Multiple embodiments relative to the design of the pilot drill portion 16 exist. In one embodiment, the end cutting surface 27 is center cutting. In a second embodiment, the end cutting surface 27 is not center cutting. In a third embodiment, the end cutting surface 27 is comprised of an adequate chip gullet 39 for chip disposal, especially when drilling bores of small radii. In fourth embodiment, the end cutting surface is substantially flat. In a fifth embodiment, the end cutting surface is concave for minimizing deflection of the tool 11. In a sixth embodiment, the end cutting surface is convex, as illustrated in FIG. 2A. As is understood in the art, a convex surface can comprise curved surfaces, distinct angled surfaces, or any variety or combination of surface conformations.

With continued reference to FIG. 2A, the mill portion 17 will be discussed in more detail. In the embodiment illustrated in FIG. 2A, the mill portion 17 is comprised of at least two drill-tap sections 18,19 of different diameter and at least one transition section 23. Each of the at least two drill-tap sections 18,19 are comprised of predetermined axial lengths, which may be equal, unequal, or any combination. The mill portion 17 as well as the at least two drill-tap sections 18,19 and at least one transition section 23 are a means for self-advancing the tool 11 along a substantially similar longitudinal axis while simultaneously cutting a hole in a work piece and forming a series of threads in the hole. In an embodiment, the mill portion is further comprised of one or more flutes. Multiple embodiments for the number of flutes exist. In an embodiment, tool designs with one to four flutes work well. In another embodiment, four or more flutes are used. The number of flutes is dependent on a specific application, a targeted work piece material, and other factors. In the embodiment illustrated in FIG. 2A, within each drill-tap section, the diameter is constant. However, as stated earlier, in another embodiment, the diameter is varying within each drill-tap section (see FIG. 4B). Further, in still another embodiment wherein there are three or more drill-tap sections, the diameter of each drill-tap section may be equal, varying, or any combination. Each drill-tap section has a unique minor diameter in relation to each other. Relative to the final diameter of the resultant drilled hole, the use of at least two drill-tap sections incrementally increases the drilled hole's diameter to the desired final diameter while simultaneously minimizing the required external axial force necessary to drill the hole in the desired work piece. The diameter increase from one drill-tap section to the next is also referred to as a "step size." A step size is related to the diameter of a hole. Generally, as the diameter of a hole increases, the optimal step size will decrease. The at least one transition section 23 is formed between two drill-tap sections and is comprised of one or more transition cutting teeth 25 with a predetermined transition rake angle 26. The at least one transition section 23 is a means for translating the created hole from one diameter to a larger diameter. In FIG. 2, two drill-tap sections are illustrated 18,19 and therefore, one transition 23 is illustrated. The number of transitions is dependent on the number of drill-tap sections. For example, two transitions are required for three drill-tap sections. Three transitions are required for four drill-tap sections and so on and so forth. The thread-tap can start at each drill-tap section 18,19 or additionally it can spiral through the transition 23 between adjacent drill-tap sections as is illustrated in FIG. 2A. Whether or not a one or more transition cutting teeth 25 continues through the transition 23 is dependent on the current hole diameter. As an example, for hole diameters less than about three-eighths of an inch, having transition cutting teeth formed only on at the least two drill-tap sections is satisfactory. In another example, for holes consisting of diameters above three-eighths of an inch, it has been proven that a transition 23 formed of one or more transition cutting teeth 25 with a spirally increasing major diameter significantly aids self-advancement of the tool 11 and prevents the resultant threads from becoming stripped.

Figure 2C:
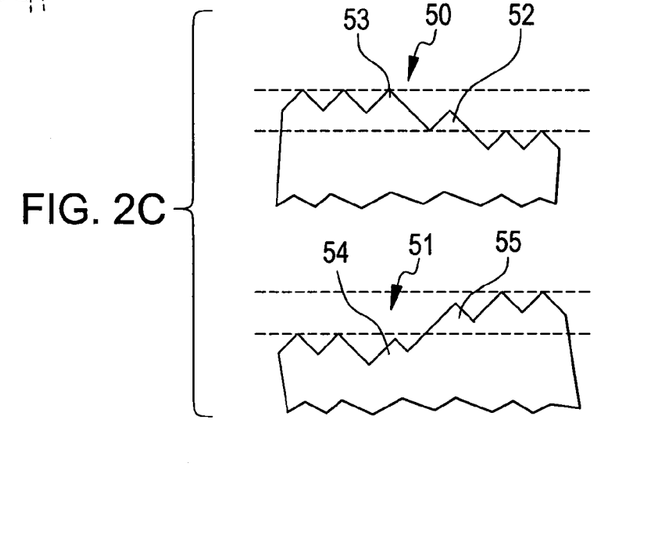
FIG. 2C illustrates a partial side view of a cutting leading edge profile and a finishing edge profile along a transition section according to an embodiment of the present apparatus.

Multiple embodiments exist for the transition cutting tooth or teeth's overall design. In a first embodiment, a plurality of spiraling transition cutting teeth is used on a transition section separated by one or more flutes. In a second embodiment, a continuous spiraling increasing transition cutting tooth is used on a transition section (i.e., no flutes). With specific reference to FIG. 2C, in a third embodiment, a transition cutting tooth is "relieved" relative to its cutting edge. "Relief" as used herein is defined as the removal of metal from behind the cutting edge between the crests of two cutting segments to provide clearance and reduce friction between the work piece being threaded and the land of the tool. Relief reduces galling that leads to tool wear. Thus, the minor and major diameters at a particular cutting segment gradually decreases from the cutting leading edge profile 50 to the finishing edge profile 51. As illustrated in FIG. 2C, a first cutting segment 52 at the cutting leading edge profile 50 has major diameter greater than the major diameter of a second cutting segment 54 at the finishing edge profile 51. Similarly, a third cutting segment 53 at the cutting leading edge profile 50 has a major diameter greater than the major diameter of a fourth cutting segment 55 at the finishing edge profile 51. Further, in a fourth embodiment, a transition section can have a unique threads per inch count or pitch, different from the pitch in each of the at least two drill-tap sections 18,19. As an example, a finer pitch, as opposed to the pitch in the at least two drill-tap sections, is helpful to ensure self-advancement between two drill-tap sections, particularly for diameters above one-half of an inch. Further, a transition section can have a unique or same lead angle relative to the lead angle of one or more of the drill-tap sections. The operation of this tool design is not highly dependent on the number of flutes.

With reference to FIGS. 2A and 2B, the drill-tap cutting teeth 21 will be described in more detail. In operation, the plurality of drill-tap cutting teeth 21 simultaneously enlarge and cut the hole (initially created by the pilot drill portion 16) along a substantially similar longitudinal axis as well as cut a series of threads while self-advancing the tool or advancing the tool with about no external axial force. The overall tool design converts an otherwise high axial load into a torsional load to effectuate self-advancement of the tool.

Conversely, related art does not concurrently enlarge and cut a hole as well as cut a series of threads along a substantially similar longitudinal axis. Rather, related art first makes a hole and then subsequently and separately cuts the threads (e.g., formed by tapping) or related art requires a helical motion and lateral displacement to cut the threads. In the present apparatus, because the hole and the threads are simultaneously cut, the act of forming the threads and the threads themselves serve to self-advance the tool 11 into the work piece, thus minimizing the required external axial force necessary to facilitate the tool's advancement. The act of cutting or forming a series of threads is performed in a radial manner, by way of rotation of the tool 11, in combination with infeeding the tool 11 along a substantially similar longitudinal axis, without the need for a helical motion. The plurality of drill-tap cutting teeth 21 spirally increase at a predetermined lead angle 45 along each of the at least two drill-tap sections 18,19. The plurality of drill-tap cutting teeth 21 may be separated by one or more flutes. Or, alternatively, a continuous spirally increasing cutting tooth may be used along one or more of the at least two drill-tap sections (i.e., no flutes). To prevent the resultant threads from stripping due to the required cutting forces between the threading tool 11 and the work piece 40, the pitch (number of threads per inch) 30 and step size must be considered. Generally, for non-metals, a coarser thread pitch is required to make for sufficient thread depth to hold and thus, prevent stripping. For metals, a finer thread pitch may be desirable. There exist multiple embodiments for the drill-tap cutting teeth 21. For example, multiple embodiments relative to the thread pitch of the tool 11 exist. In one embodiment, the tool 11 can comprise one constant thread pitch over all drill-tap sections. In a second embodiment, the tool 11 can comprise a variable thread pitch where each drill-tap section has a different number of threads per inch. As another example, multiple embodiments for each drill-tap section also exist. For example, in one embodiment, a predetermined drill-tap section is comprised of a chamfered end or tapering of the plurality of drill-tap cutting teeth by relieving the crest of a predetermined number of drill-tap cutting teeth to distribute the cutting action over several drill-tap cutting teeth. In a second embodiment, a predetermined drill-tap section is comprised of a back taper. As still another example, multiple embodiments for a drill-tap cutting tooth's rake exist. In one embodiment, the rake has a negative angle. In a second embodiment, the rake as a positive angle. In a third embodiment, there is a zero rake. As stated above, tool structures are influenced by a specific application and performance specifications. An optimization analysis is generally performed to determine the thread pitch, step size, and other tool specifications. For example, the proper combination of step size, cutting angle, thread advance, flute design, rake, chamfer relief, back taper, thread relief, as well as other tool specifications for a particular application and set of performance specifications is determined via a comprehensive engineering analysis.

Figures 4A, 4B:
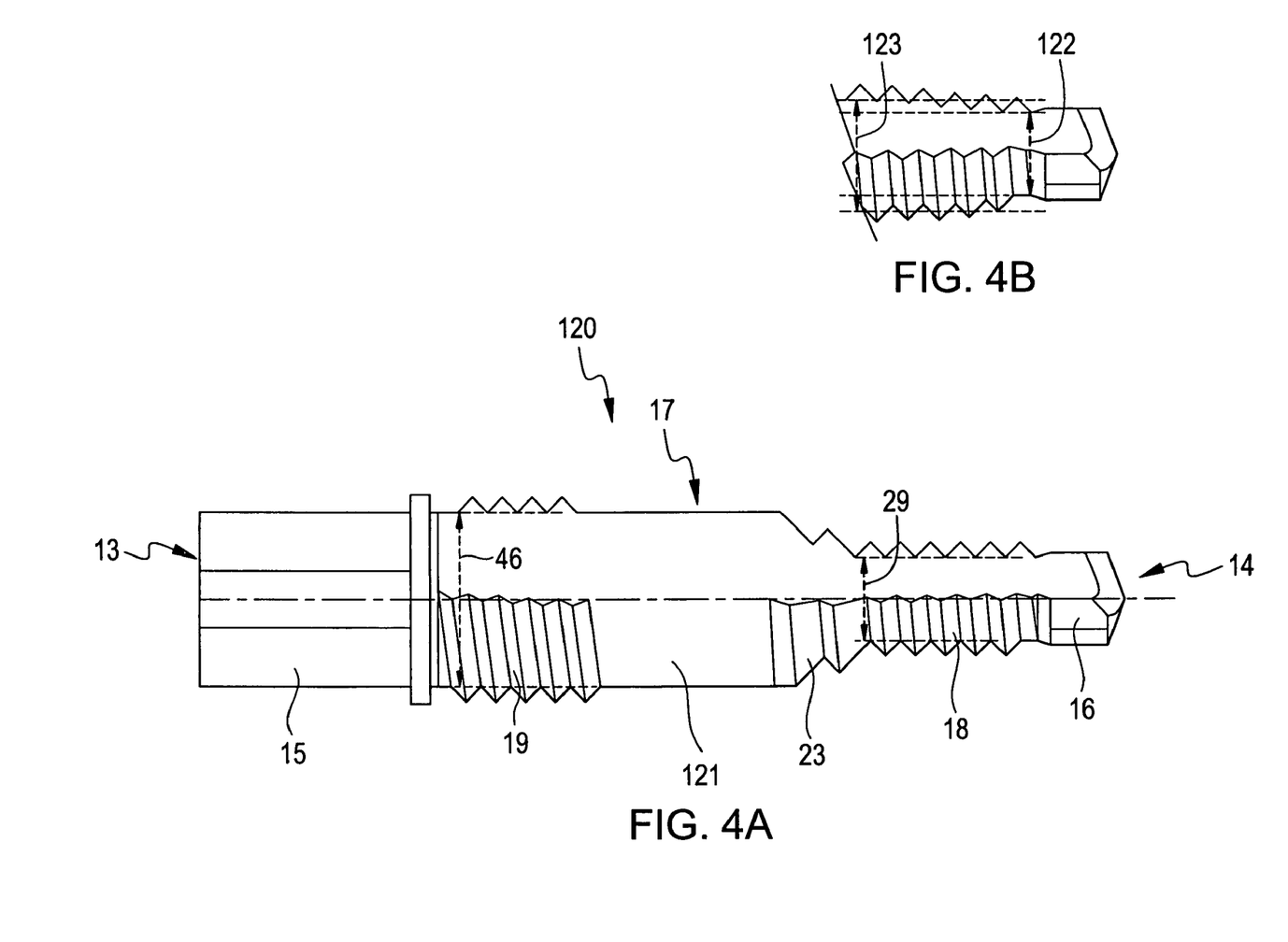
FIG. 4A illustrates a side view of a combined hole making and threading tool according to an embodiment of the present apparatus.
FIG. 4B illustrates a partial side view of a combined hole making and threading tool according to an embodiment of the present apparatus.

With particular reference to FIG. 4A, there is illustrated another embodiment of a self-advancing step-tap combined hole making and threading tool 120. Similar to the tool 11 of FIG. 2A, tool 120 has a predetermined axial length as well as proximal 13 and distal 14 ends. A shank 15 of predetermined axial length is located at the proximal end 13. A pilot drill portion 16 is located at the distal end 14. Intermediate to the shank 15 and pilot drill portion 16 is a mill portion 17 which is comprised of at least one drill-tap section 18,19 wherein each of said at least one drill-tap section 18,19 has a unique minor diameter 29,46, respectively or unique range of minor diameters in relation to each drill-tap section. In FIG. 4A, the first distal diameter and first proximal diameter for each of the two drill-tap sections 18,19 are equivalent. However, in another embodiment, the first distal diameter 122 and first proximal diameter 123 for one of said at least one drill-tap section is not equivalent (see FIG. 4B). The mill portion 17 is further comprised of at least one flat drilling section 121 and at least one transition section 23, wherein each of said at least one transition section 23 is sandwiched between a drill-tap section and a flat drilling section. In the embodiment illustrated in FIG. 4, the at least one flat drilling section 121 forms a smoothed hole in between the two drill-tap sections 18,19. When threads are not needed and a close fit is required, a smoothed hole is generally desired. In operation, tool 120 rotation can be terminated along the flat drilling section, as opposed to a drill-tap section, to effectuate a smoothed hole. The multiple embodiments described above for tool 11 also apply for tool 120.

As an example of a specific design, a tool was developed for the Space Shuttle reinforced carbon-carbon leading edge material that is an abrasive non-metal about one-quarter inch thick. The pilot drill portion, in this example design, varies in diameter from one-eighth to three-sixteenth inches with two flutes and a convex cutting point angle from about 115 to about 135 degrees. The cutting edge relief-web for the pilot drill portion is ground to be about 0.050 inch wide to increase the cutting tip pressure for a given applied axial load. Further, the pilot drill portion's rake angle can be from about 0 degrees to about 20 degrees. The pilot drill portion is made about 0.3 inches in length, thereby allowing the pilot hole to be completed before the engagement of the first drill-tap section. The actual measured axial force during the creation of the pilot hole was about 4 pounds. The maximum torque values for holes up to about 1 1/16 inch diameter were less than about 20 ft-lbs. After the engagement of the first drill-tap section, no axial force was required. Relative to the first drill-tap section in this example design, during operation, the first drill-tap section engages the pilot hole and increases the pilot hole's diameter by about 0.03 to about 0.06 inches. This increase is also consistent with each subsequent step size in the current example design. As a hole's diameter becomes greater than about one-half inches, in an embodiment, a step size less than or equal to about 0.03 inches is recommended. For hole diameters less than one-half inches, in another embodiment, a step size from about 0.05 to about 0.06 inches is acceptable. The length of each drill-tap section is selected such that one complete step is cut before then next drill-tap section engages the hole. In the current example design, a drill-tap section length of 0.3 inches was used. Continuing with this example design, each transition between two drill-tap sections consists of a transition rake angle from about 0 degrees to about 20 degrees. A threads per inch (TPI) from 13 to 18 TPI for the plurality of cutting teeth formed along each drill-tap section worked well for this application. Two flutes were selected in this design, simply based on ease of machining.

Material selection for the subject tool is dependent on its application as well as other factors. As is known in the art, multiple materials are available depending on the application and other factors. For example, air-hardening steel can be used for fast production of engineering prototypes where a limited number of uses are required. In another example, oil-hardening tool steel or cobalt tool steel are acceptable material for many applications. Solid tungsten carbide is also a popular and available material. More exotic material, such as diamond coatings are also available. The reader will recognize that specifications such as anticipated tool life and uses as well as economic factors such as price can drive the final material selection.

Figure 3A:
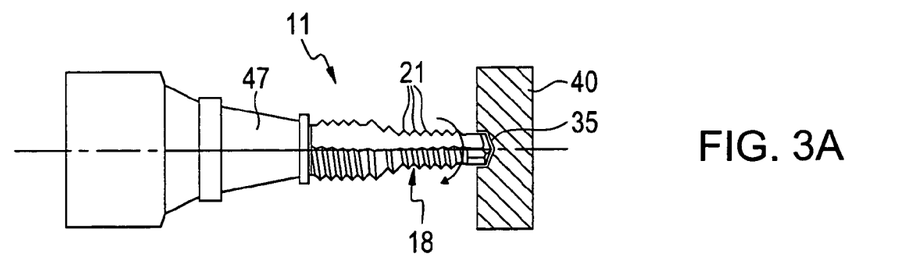
FIG. 3A illustrates a combined hole making and threading tool's pilot drill portion creating an initial pilot hole in a work piece according to an example of a method of use for an embodiment of the present apparatus.
Figure 3B:
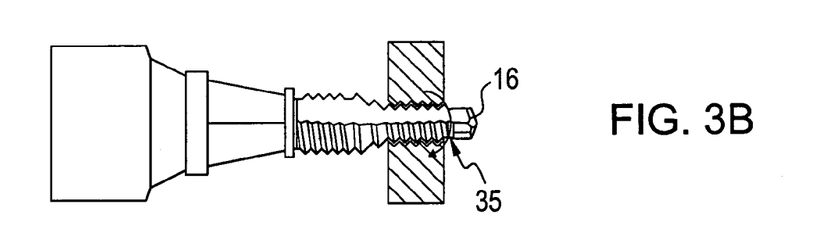
FIG. 3B illustrates a combined hole making and threading tool's first drill-tap section expanding the initial pilot hole illustrated in FIG. 3A. and forming a series of threads in the expanded hole according to an example of a method of use for an embodiment of the present apparatus.
Figure 3C:
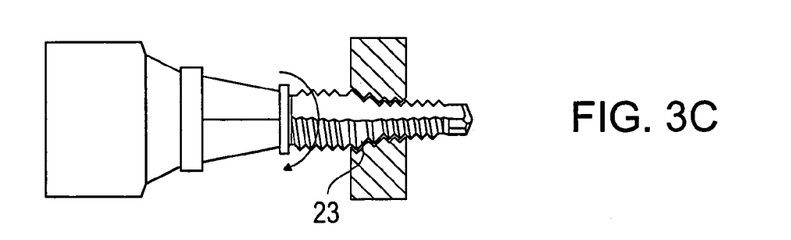
FIG. 3C illustrates a combined hole making and threading tool's transition section expanding the hole illustrated in FIG. 3B, according to an example of a method of use for an embodiment of the present apparatus.
Figure 3D:
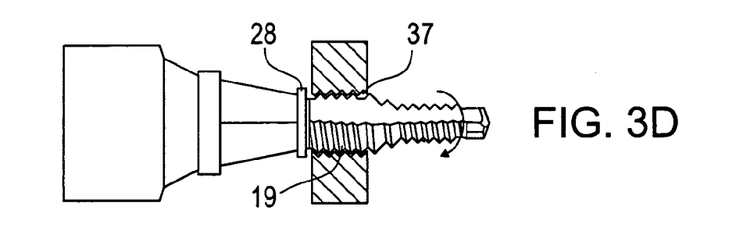
FIG. 3D illustrates a combined hole making and threading tool's second drill-tap section continuing the hole making and thread forming sequentially illustrated in FIGS. 3A-3C, according to an example of a method of use for an embodiment of the present apparatus.
Figure 3E:
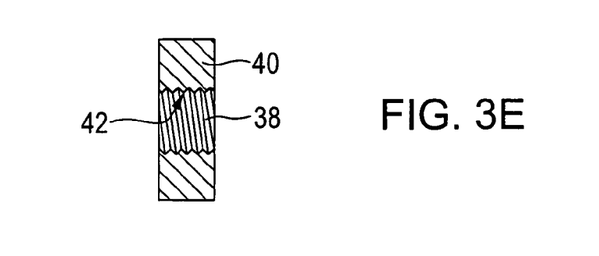
FIG. 3E illustrates a finished threaded hole formed by the sequential steps illustrated in FIGS. 3A-3D.

Multiple methods of operation exist for the various embodiments described supra. For example, with reference to FIGS. 3A-3E, the tool 11 is first installed in a commercial hand-held drill by inserting and locking the shaft 12 of the tool 11 in the drill chuck 47 of the hand-held drill. A drill chuck is a mechanical device, which is mounted on a drill, which has jaws and a collar that is tightened to grip and hold a drill bit. Next, as is specifically illustrated in FIG. 3A, a first bore portion 35 is created by the pilot drill portion 16 by rotating the tool 11 about its longitudinal axis L and axially infeeding the tool 11 into the work piece 40, wherein the rotation of the tool 11 is created by the commercial hand-held drill and an external axial force is applied. Creation of the first bore portion 35 is the only phase wherein an external axial force is required. Subsequent to the previous step and consistent with FIG. 3B, a second bore and threaded portion 36 is created by the first drill-tap 18 section as tool 11 continuously rotates about its longitudinal axis L. The plurality of cutting teeth 21 on the first drill-tap section 18 serves to advance the tool 11 and therefore an about no external axial force is required after the first drill-tap section 18 engages the first bore portion 35. The first drill-tap section 18 serves to increase the hole's diameter, wherein the diameter of the second bore and threaded portion 36 is greater than the diameter of the first bore portion 35. Tool 11 continues to advance into the work piece 40 along a substantially similar longitudinal axis as compared to the initial longitudinal axis in relation to the first bore portion 35. In other words, a helical rotation of the tool comprising multiple longitudinal axes is not required to form threads in the second bore and threaded portion 36. Further, a continuous feeding of tool 11 occurs. Conversely, tool 11 does not have to be retracted and then re-fed into the created hole. Next, as illustrated in FIG. 3C, after the rearward end of the first drill-tap section 18 enters the second bore and threaded portion 36, the transition section 23 engages the second bore and threaded portion 36. The tool 11 is continuously rotated by the commercial hand-held drill and the transition section 23 enlarges the second bore and threaded portion 36 to begin the creation of a third bore and threaded portion 37. As with the first drill-tap section 18, the transition section 23 progresses through the work piece 40 along a substantially similar longitudinal axis as compared to the initial longitudinal axis in relation to the first bore portion 35. The transition section 23 increases the diameter of resulted hole wherein the diameter of the third bore and threaded portion 37 is greater than the second bore and threaded portion 36. As illustrated in FIG. 3D, after the rearward end of the transition section 23 enters the third bore and threaded portion 37, the second drill-tap section 19 engages the third bore and threaded portion 37. The tool 11 is continuously rotated by the commercial hand-held drill and advances into the work piece 40 along a substantially similar longitudinal axis as compared to the initial longitudinal axis in relation to the first bore portion 35. The second drill-tap section 19 forms and smooths the created threads along the wall 42 of the resultant hole 38. After the creation of the resultant hole 38, the commercial drill is turned off and the rotation as well as the advancement of tool 11 ends. If necessary, the stop-lip 28 of tool 11 serves to engage the work piece 40 and stop the advancement of tool 11. The tool 11 is subsequently retracted from the resultant hole 38 by reversing the rotation via the hand-held drill. FIG. 3E illustrates a completed threaded hole that can be created by tool 11 in the manner described above.

What is claimed is:

1. A tool for simultaneously forming a bore in a work piece and forming a series of threads in said bore, wherein said tool has a predetermined axial length, a proximal end, and a distal end, said tool comprising:
   a shank located at said proximal end;
   a pilot drill portion located at said distal end; and
   a mill portion intermediately disposed between said shank and said pilot drill portion,
   wherein said mill portion is comprised of at least two drill-tap sections of predetermined axial lengths and at least one transition section of predetermined axial length,
   wherein each of said at least one transition section is sandwiched between a distinct set of two of said at least two drill-tap sections,
   wherein each of said at least two drill-tap sections has a predetermined first distal diameter and a predetermined first proximal diameter,
   wherein each of said at least one transition section has a predetermined second distal diameter and a predetermined second proximal diameter,
   wherein said second distal diameter is less than said second proximal diameter,
   wherein each of said at least one transition section has a second distal diameter equivalent to a distinct one of said at least two drill-tap sections' first proximal diameter,
   wherein each of said at least one transition section has a second proximal diameter equivalent to a distinct one of said at least two drill-tap sections' first distal diameter,
   wherein each of said at least two drill-tap sections is formed of one or more drill-tap cutting teeth spirally increasing along said at least two drill-tap sections,
   wherein said tool is self-advanced in said work piece along said formed threads, and
   wherein said tool simultaneously forms said bore and said series of threads along a substantially similar longitudinal axis.

2. The tool of claim 1, wherein said mill portion is formed of at least one flute.

3. The tool of claim 1, wherein said shank is designed to be compatible for insertion in a hand-held drill.

4. The tool of claim 1, wherein said first distal diameter and said first proximal diameter for each of said at least two drill-tap sections are equivalent.

5. The tool of claim 1, wherein said first distal diameter and said first proximal diameter for each of said at least two drill-tap sections are either equivalent or not equivalent.

6. The tool of claim 4, wherein said plurality of drill-tap cutting teeth for each of said at least two drill-tap sections are comprised of a predetermined constant pitch, a predetermined angle of thread for each drill-tap cutting tooth, and a predetermined constant major diameter for each drill-tap cutting tooth.

7. The tool of claim 1, wherein said pilot drill portion is comprised of an end cutting surface.

8. The tool of claim 7, wherein said end cutting surface is center cutting.

9. The tool of claim 7, wherein said end cutting surface is comprised of a chip gullet.

10. The tool of claim 1, wherein said predetermined axial length of the at least two drill-tap sections in closest relation to said proximal end of said tool is greater than the depth of said work piece.

11. The tool of claim 1, wherein each of said at least one transition section is formed of one or more transition cutting teeth spirally increasing along said at least one transition section.

12. The tool of claim 11 wherein one of said at least one transition section is formed of at least one flute, and wherein at least one of said one or more transition cutting teeth is relieved such that at least one cutting tooth formed at the cutting leading edge profile has a major diameter greater than said at least one cutting tooth's major diameter at the finishing edge profile.

13. The tool of claim 11, wherein the one or more transition cutting teeth is a plurality of transition cutting teeth and the threads per inch count for the plurality of transition cutting teeth for each of the one or more transition sections is not equivalent to the threads per inch count for the plurality of drill-tap cutting teeth for each of the plurality of drill-tap sections.

14. The tool of claim 1, further comprising a stop-lip located intermediate to said shank and a distinct one of said at least two drill-tap sections.

15. A method for simultaneously forming a bore and a series of threads in said bore in a work piece, comprising the steps of:

providing a hand-held drill comprising a drill chuck;

providing a tool and mechanically connecting said tool to said drill chuck of said hand-held drill, wherein said tool has a predetermined axial length, a proximal end, and a distal end, and wherein said tool is comprised of:

a shank located at said proximal end;

a pilot drill portion located at said distal end; and a mill portion intermediately disposed between said shank and said pilot drill portion, wherein said mill portion is comprised of at least two drill-tap sections of predetermined axial lengths and at least one transition section of predetermined axial length, wherein each of said at least one transition section is sandwiched between a distinct set of two of said at least two drill-tap sections, wherein each of said at least two drill-tap sections has a predetermined first distal diameter and a predetermined first proximal diameter, wherein each of said at least one transition section has a predetermined second distal diameter and a predetermined second proximal diameter, wherein said second distal diameter is less than said second proximal diameter, wherein each of said at least one transition section has a second distal diameter equivalent, to a distinct one of said at least two drill-tap sections' first proximal diameter, wherein each of said at least one transition section has a second proximal diameter equivalent to a distinct one of said at least two drill-tap sections' first distal diameter, wherein each of said at least two drill-tap sections is formed of one or more drill-tap cutting teeth spirally increasing along said at least two drill-tap sections, wherein said tool is self-advanced in said work piece along said formed threads, and wherein said tool simultaneously forms said bore and said series of threads along a substantially similar longitudinal axis;

rotating said tool in a predetermined direction through operation of said hand-held drill;

producing an initial pilot hole in said work piece by feeding said tool in said work piece along a predetermined longitudinal axis;

simultaneously producing a first bore and thread portion in said work piece by self-advancing said tool in said work piece along said predetermined longitudinal axis or a substantially similar longitudinal axis;

expanding said first bore and thread portion in said workpiece by self-advancing said tool along said predetermined longitudinal axis or a substantially similar longitudinal axis; and simultaneously producing a second bore and thread portion in said work piece by self-advancing said tool in said work piece along said predetermined longitudinal axis or a substantially similar longitudinal axis.

16. The method of claim 15, further comprising the steps of:

terminating the rotation of said tool in said predetermined direction;

reversing the rotation of said tool in relation to said predetermined direction; and removing said tool from said second bore and thread portion in said work piece.

17. The method of claim 15, wherein said tool further comprises a stop-lip located intermediate to said shank and a distinct one of said at least two drill-tap sections, and further comprising the steps of:

terminating the rotation of said tool in said predetermined direction upon contact of said stop-lip with said work piece;

reversing the rotation of said tool in relation to said predetermined direction; and removing said tool from said second bore and thread portion in said work piece.

18. A tool for simultaneously forming a bore in a work piece and forming a series of threads in said bore, wherein said tool has a predetermined axial length, a proximal end, and a distal end, said tool comprising:

a shank located at said proximal end;

a pilot drill portion located at said distal end; and a mill portion intermediately disposed between said shank and said pilot drill portion, wherein said mill portion is comprised of at least one drill-tap section of predetermined axial length, at least one transition section of predetermined axial length, and at least one flat drilling section of predetermined axial length, wherein each of said at least one transition section is sandwiched between one of the at least one drill-tap sections and one of the at least one flat drilling sections, wherein each of said at least one drill-tap section has a predetermined first distal diameter and a predetermined first proximal diameter, wherein each of said at least one transition section has a predetermined second distal diameter and a predetermined second proximal diameter, wherein each of said at least one flat drilling section has a predetermined third distal diameter and a predetermined third proximal diameter, wherein said second distal diameter is less than said second proximal diameter, wherein each of said at least one transition section has a second distal diameter equivalent to a distinct one of said at least one drill-tap section's first proximal diameter, wherein each of said at least one transition section has a second proximal diameter equivalent to a distinct one of said at least one flat drilling section's third distal diameter, wherein each of said at least one drill-tap section is formed of one or more drill-tap cutting teeth spirally increasing along said at least one drill-tap section, wherein said tool is self-advanced in said work piece along said formed threads and said at least one drill tap section, and wherein said tool simultaneously forms said bore and said series of threads along a substantially similar longitudinal axis.

* * * * *